US011893092B2

(12) United States Patent
Case

(10) Patent No.: US 11,893,092 B2
(45) Date of Patent: Feb. 6, 2024

(54) PRIVILEGE AUTO PLATFORM

(71) Applicants: SONY GROUP CORPORATION, Tokyo (JP); SONY PICTURES ENTERTAINMENT INC., Culver City, CA (US)

(72) Inventor: Andy Case, Culver City, CA (US)

(73) Assignees: Sony Group Corporation, Tokyo (JP); Sony Pictures Entertainment Inc., Culver city, CA (US)

( * ) Notice: Subject to any disclaimer, the term of this patent is extended or adjusted under 35 U.S.C. 154(b) by 443 days.

(21) Appl. No.: 16/746,530

(22) Filed: Jan. 17, 2020

(65) Prior Publication Data
US 2021/0224359 A1 Jul. 22, 2021

(51) Int. Cl.
G06F 21/12 (2013.01)
G06Q 20/12 (2012.01)
H04L 67/025 (2022.01)
G06F 21/62 (2013.01)
G06F 21/10 (2013.01)

(52) U.S. Cl.
CPC .......... G06F 21/121 (2013.01); G06F 21/629 (2013.01); G06Q 20/1235 (2013.01); H04L 67/025 (2013.01); G06F 21/1011 (2023.08)

(58) Field of Classification Search
CPC ................ G06F 21/121; G06F 21/629; G06F 2221/0704; G06F 21/44; G06F 21/1011; G06Q 20/1235; H04L 67/025; H04L 63/08; H04L 67/12; H04L 67/2809; H04L 67/562
See application file for complete search history.

(56) References Cited

U.S. PATENT DOCUMENTS

| 6,674,767 B1* | 1/2004 | Kadyk ...................... H04L 9/40 719/321 |
| 8,316,154 B2* | 11/2012 | Yoneda .................. H04L 12/282 709/248 |
| 8,570,949 B2* | 10/2013 | Matsumoto ........... H04M 15/68 455/566 |
| 8,707,044 B2* | 4/2014 | Shim ..................... G06F 21/606 713/171 |
| 9,444,892 B1* | 9/2016 | Amireddy ............... H04W 4/12 |
| 9,778,653 B1* | 10/2017 | McClintock ........... G06Q 10/08 |

(Continued)

FOREIGN PATENT DOCUMENTS

| JP | H11175457 A | 7/1999 |
| JP | 2002320280 A | 10/2002 |

(Continued)

Primary Examiner — David Garcia Cervetti
(74) Attorney, Agent, or Firm — Procopio, Cory, Hargreaves & Savitch LLP

(57) ABSTRACT

Enabling control of authenticated applications and websites from other applications and websites within an auto entertainment service, including: implementing controls of the auto entertainment service within a privilege auto platform with a defined structure that enables a controller to issue a command; constructing calls appropriate to execute the command; routing playback controls through the privilege auto platform; issuing the command to the privilege auto platform with a content ID; and receiving the command and making the calls for content and digital rights management to execute the command.

13 Claims, 3 Drawing Sheets

(56) References Cited

U.S. PATENT DOCUMENTS

| | | | |
|---|---|---|---|
| 9,875,589 B1* | 1/2018 | Buttolo | G07C 9/00571 |
| 10,123,155 B2* | 11/2018 | Grover | H04W 12/08 |
| 10,560,736 B2* | 2/2020 | Raajan | H04N 21/41422 |
| 10,678,497 B2* | 6/2020 | Oskarsson | H04L 67/5681 |
| 10,891,282 B1* | 1/2021 | Willingham | G06F 21/64 |
| 11,208,129 B2* | 12/2021 | Kumar | G06V 20/52 |
| 2003/0182577 A1* | 9/2003 | Mocek | G06F 21/51 |
| | | | 713/175 |
| 2004/0185842 A1* | 9/2004 | Spaur | H04W 12/069 |
| | | | 455/410 |
| 2007/0150572 A1* | 6/2007 | Cox | H04L 43/00 |
| | | | 709/223 |
| 2009/0243869 A1* | 10/2009 | Sanderford, Jr. | G01D 4/002 |
| | | | 340/657 |
| 2010/0138671 A1* | 6/2010 | Kim | G06F 21/10 |
| | | | 713/189 |
| 2010/0235891 A1* | 9/2010 | Oglesbee | H04W 4/029 |
| | | | 707/610 |
| 2013/0340065 A1* | 12/2013 | Dyer | H04L 67/535 |
| | | | 726/12 |
| 2014/0033293 A1* | 1/2014 | Kennedy | H04W 12/069 |
| | | | 726/10 |
| 2014/0179274 A1* | 6/2014 | O'Meara | H04W 76/10 |
| | | | 455/411 |
| 2014/0289387 A1* | 9/2014 | Ghosh | H04L 41/0893 |
| | | | 709/223 |
| 2014/0289388 A1* | 9/2014 | Ghosh | H04L 12/2827 |
| | | | 709/223 |
| 2014/0344689 A1* | 11/2014 | Scott | H04N 21/41265 |
| | | | 715/716 |
| 2015/0057839 A1* | 2/2015 | Chang | B60R 16/0373 |
| | | | 701/2 |
| 2015/0120416 A1* | 4/2015 | Davis | G06Q 30/0217 |
| | | | 705/14.62 |
| 2015/0227890 A1* | 8/2015 | Bednarek | G06Q 10/0833 |
| | | | 705/26.81 |
| 2015/0266356 A1* | 9/2015 | Fischer | G05B 15/02 |
| | | | 700/275 |
| 2015/0343993 A1* | 12/2015 | Ferrieres | B60R 25/04 |
| | | | 701/2 |
| 2015/0381751 A1* | 12/2015 | Haran | H04L 67/563 |
| | | | 709/217 |
| 2016/0013934 A1* | 1/2016 | Smereka | H04W 12/033 |
| | | | 713/171 |
| 2016/0016523 A1* | 1/2016 | Yousefi | H04L 47/2433 |
| | | | 370/401 |
| 2016/0066004 A1* | 3/2016 | Lieu | H04N 21/42684 |
| | | | 725/29 |
| 2016/0125672 A1* | 5/2016 | Pekar | G05B 23/0221 |
| | | | 702/32 |
| 2016/0210131 A1* | 7/2016 | Vangelov | H04L 67/12 |
| 2016/0214571 A1* | 7/2016 | Othmer | B60R 25/01 |
| 2017/0129425 A1* | 5/2017 | Dalke | H04L 61/5014 |
| 2017/0161973 A1* | 6/2017 | Katta | G06Q 40/08 |
| 2017/0208422 A1* | 7/2017 | Grover | H04W 4/80 |
| 2017/0257345 A1* | 9/2017 | Westra | H04W 12/08 |
| 2017/0295253 A1* | 10/2017 | Siegel | H04L 63/08 |
| 2017/0329589 A1* | 11/2017 | Kominar | H04L 63/10 |
| 2018/0072190 A1* | 3/2018 | Kowalski | H04W 12/06 |
| 2018/0091930 A1* | 3/2018 | Jefferies | G07C 9/00571 |
| 2018/0097721 A1* | 4/2018 | Matsui | H04L 45/28 |
| 2018/0167790 A1* | 6/2018 | Cavalcanti | H04W 4/44 |
| 2018/0189103 A1* | 7/2018 | Teshler | H04L 41/04 |
| 2018/0322603 A1* | 11/2018 | Hu | G06Q 30/0645 |
| 2019/0340844 A1* | 11/2019 | Tonshal | G07C 5/0808 |
| 2019/0363974 A1* | 11/2019 | Wang | H04L 61/00 |
| 2020/0019415 A1* | 1/2020 | Kassner | H04L 65/1059 |
| 2020/0104467 A1* | 4/2020 | Lesser | G06F 21/6245 |
| 2020/0159251 A1* | 5/2020 | Iwasaki | B60R 16/037 |
| 2020/0202645 A1* | 6/2020 | Gintz | G07C 5/0825 |
| 2020/0204371 A1* | 6/2020 | Chengalvala | H04L 63/105 |
| 2020/0259919 A1* | 8/2020 | Lepp | H04L 63/0227 |
| 2020/0346598 A1* | 11/2020 | Boston | G06F 8/65 |
| 2020/0364953 A1* | 11/2020 | Simoudis | G06N 5/022 |
| 2021/0035379 A1* | 2/2021 | Sasaki | G07C 5/008 |
| 2021/0218771 A1* | 7/2021 | Khouderchah | H04L 63/0876 |
| 2021/0398364 A1* | 12/2021 | Tschache | G06F 8/65 |
| 2022/0063689 A1* | 3/2022 | Kumar | B61L 15/0072 |
| 2022/0272168 A1* | 8/2022 | Raisher | G01C 21/3617 |

FOREIGN PATENT DOCUMENTS

| | | |
|---|---|---|
| JP | 2014137805 A | 7/2014 |
| WO | WO-2019/165532 A1 | 9/2019 |

* cited by examiner

PRIVILEGE AUTO PLATFORM

BACKGROUND

Field

The present disclosure relates to a digital platform, and more specifically, to a digital platform that can issue and receive application statuses and controls from one device to another device.

Background

Currently, it is not easy to control applications and websites from other applications and websites within an entertainment service, while maintaining the autonomy of each application or website within the service. For example, it is not easy to control applications and websites residing on devices within or near a vehicle from the front panel controller.

SUMMARY

The present disclosure provides for enabling control of authenticated applications and websites from other applications and websites within an entertainment service, while maintaining the autonomy of each application or website within the service.

In one implementation, a system for enabling control of authenticated applications and websites from other applications and websites within an auto entertainment service is disclosed. The system includes: a privilege auto platform configured to enable control of the authenticated applications and websites, wherein controls of the auto entertainment service are implemented within the privilege auto platform with a defined structure that enables the controller to issue a command; and a plurality of devices coupled to the privilege auto platform, the plurality of device comprising at least one controlled device and at least one controller, wherein the privilege auto platform is configured to enable control of the authenticated applications and websites on one of the at least one controlled device from other applications and websites on another of the at least one controller within the auto entertainment service, wherein the at least one controlled device constructs calls appropriate to execute the command.

In one implementation, the controls of the auto entertainment service are implemented in an online mode or offline mode. In one implementation, playback controls in the online mode are routed through the privilege auto platform that routes data traffic, synchronizes video playback, and reports playback status. In one implementation, the plurality of devices comprises a center stack module and a rear seat infotainments. In one implementation, the plurality of devices comprises bring-your-own devices or out-of-car devices. In one implementation, the controller issues the command with a content ID to the privilege auto platform. In one implementation, the controlled device receives the command and makes appropriate calls for content and digital rights management to execute the command. In one implementation, the content calls comprise calls directed to content delivery networks to deliver the content to the controlled device. In one implementation, the controls of the auto entertainment service are initiated using pre-defined mechanisms within the applications and websites.

In another implementation, a method for enabling control of authenticated applications and websites from other applications and websites within an auto entertainment service is disclosed. The method includes: implementing controls of the auto entertainment service within a privilege auto platform with a defined structure that enables a controller to issue a command; constructing calls appropriate to execute the command; routing playback controls through the privilege auto platform; issuing the command to the privilege auto platform with a content ID; and receiving the command and making the calls for content and digital rights management to execute the command.

In one implementation, the controls of the auto entertainment service are implemented in an online mode or offline mode. In one implementation, the calls for the content include calls directed to content delivery networks to deliver the content to a controlled device in the online mode. In one implementation, the method further includes enabling offline controls and opening a temporary socket to facilitate direct communication between the controller and a controlled device in the offline mode. In one implementation, the playback controls in the online mode are routed through the privilege auto platform that routes data traffic, synchronizes video playback, and reports playback status. In one implementation, the controls of the auto entertainment service are initiated using pre-defined mechanisms within the applications and websites.

In another implementation, a non-transitory computer-readable storage medium storing a computer program to control authenticated applications and websites from other applications and websites within an auto entertainment service is disclosed. The computer program includes executable instructions that cause a computer to: implement controls of the auto entertainment service within a privilege auto platform with a defined structure that enables a controller to issue a command; construct calls appropriate to execute the command; route playback controls through the privilege auto platform; issue the command to the privilege auto platform with a content ID; receive the command and making the calls for content and digital rights management to execute the command.

In one implementation, the controls of the auto entertainment service are implemented in an online mode or offline mode. In one implementation, the calls for the content include calls directed to content delivery networks to deliver the content to a controlled device in the online mode. In one implementation, the computer program further includes executable instructions that cause a computer to enable offline controls and open a temporary socket to facilitate direct communication between the controller and a controlled device in the offline mode. In one implementation, the playback controls in the online mode are routed through the privilege auto platform that routes data traffic, synchronizes video playback, and reports payback status.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1:
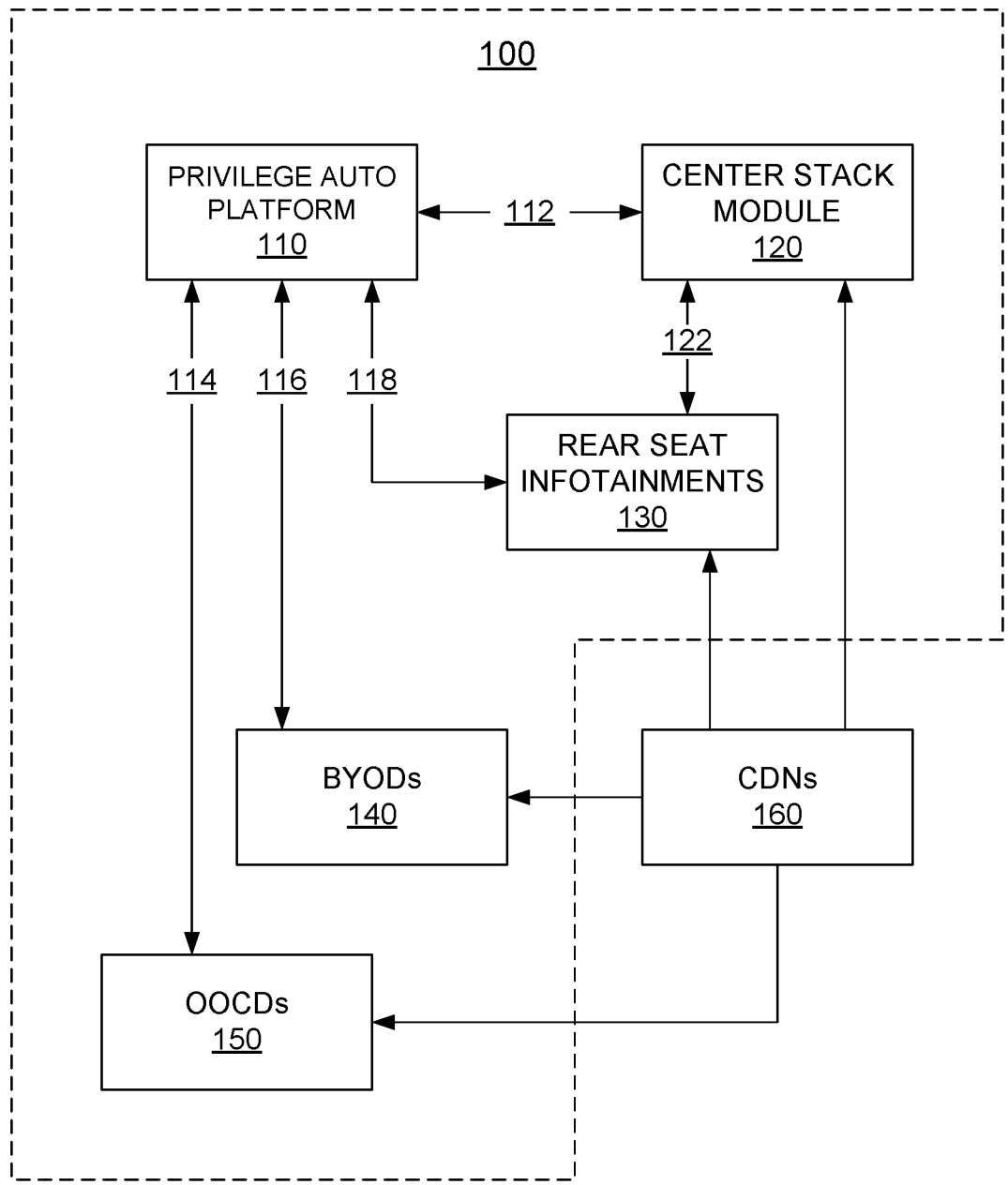
FIG. 1 is a block diagram of a privilege auto system for enabling control of authenticated applications and websites from other applications and websites within an auto entertainment service in accordance with one implementation of the present disclosure.

As described above, it is not easy to control applications and websites from other applications and websites within an entertainment service, while maintaining the autonomy of each application or website within the service.

Certain implementations of the present disclosure include enabling control of authenticated applications and websites from other applications and websites within an entertainment service, while maintaining the autonomy of each application or website within the service. In one implementation, this is done using a digital platform that can issue and receive application statuses and controls from one device to another device. In one implementation, the digital platform is configured to provide "in-car" (in-automobile or "auto" for short) entertainment. In another implementation, the digital platform is configured to redeem/buy and watch movies and other content sponsored by participating partners. Consumers then generate accounts and access content from eligible promotions.

After reading the descriptions recited in this section, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, the digital platform includes auto entertainment service controls that are defined by a set of application programming interfaces (APIs), which allows applications and websites to issue commands to other applications and websites within the service. An application status, such as open/shutdown and playback controls can be issued and received from one device to another device via platform communication. Thus, the auto entertainment service controls enable applications and websites within the entertainment service to control other authenticated applications and websites within the service, while maintaining the autonomy of each application or website within the service. In one implementation, the architecture and functionality of the entertainment service controls are configured with a specific focus on vehicle implementations. However, the feature exists at a platform level and could be used in any environment including non-vehicle environment.

In one implementation, the playback controls are achieved through a set of controller/listener APIs that sends or receives commands. For example, the auto entertainment service controls are implemented within the digital platform with a defined structure that enables the controller to issue a command, and optionally a content identifier, to the controlled device. The controlled device then constructs calls appropriate to execute the command. The commands of the entertainment service controls apply all service rules (e.g., parental controls, device limits, and content availability) and each command is made so that the controller does not need to understand the controlled device.

In another implementation, the devices do not need to be on the same network to issue or receive a command. That is, since commands are issued through the platform, they are not network dependent and do not require a device-to-device connection. For vehicle implementations, a communication broker may be built in locally to avoid external network calls and allow offline communications between devices on a local network.

In another implementation, the control commands are issued to the platform containing device identifier, command, and content identifier. In one example, the commands from the controller application are sent using a key-value method (wherein the key is the name and the value is the content) allowing for lightweight communication that the controlled device can interpret. In this implementation, the controlled device is responsible for making the appropriate platform network calls to execute the command.

FIG. 1 is a block diagram of a privilege auto system 100 for enabling control of authenticated applications and websites from other applications and websites within an auto entertainment service in accordance with one implementation of the present disclosure. In the illustrated implementation of FIG. 1, the system 100 includes a privilege auto platform 110, a center stack module (CSM) 120, and rear seat infotainments (PSI) 130. In one implementation, the system 100 further includes bring-your-own devices (BYODs) 140 and out-of-car devices (OOCDs) 150. The BYODs 140 may be referred to as brought-in devices, while the OOCDs 150 may be referred to as in-home devices. Once the devices 120, 130, 140, 150 are authenticated and the accounts are created, the content is supplied to the devices 120, 130, 140, 150 from the content delivery networks (CDNs) 160.

In one implementation, the CSM 120 includes a front panel of the vehicle and electronics/controls coupled to the front panel. In one implementation, the RSIs 130 include rear seat screens and electronics/controls coupled to the rear seat screens. In one implementation, the BYODs 140 and the OOCDs 150 include mobile phones, tablet PCs, laptops, and other electronic devices including displays. In one implementation, the CDNs 160 are configured as a network of distributed servers that deliver pages and other web content to a user, based on the geographic locations of the user, the origin of the webpage and the content delivery server.

In the illustrated implementation of FIG. 1, the privilege auto platform 110 enables control of authenticated applications and websites on any one of the devices 120, 130, 140, 150 from other applications and websites on another one of the devices 120, 130, 140, 150 within an auto entertainment service. As stated above, the auto entertainment service controls are implemented within the privilege auto platform 110 with a defined structure that enables the controller to issue a command. The controlled device then constructs calls appropriate to execute the command. The controls can be achieved online or offline.

In one implementation, the online playback controls are routed through a devoted cloud server (e.g., the privilege auto platform 110) that routes data traffic, synchronizes video playback, and reports playback status. Thus, in the online mode, the control commands can be sent or received from any device. For example, the control command can be sent from the CSM 120 to one of the RSIs 130 as follows: from the CSM 120 through connection 112 to the platform 110; and from the platform 110 through connection 118 to one of the RSIs 130. In another example, the control command can be sent from the CSM 120 to one of the BYODs 140 as follows: from the CSM 120 through connection 112 to the platform 110; and from the platform 110 through connection 116 to one of the BYODs 140. In another example, the control command can be sent from the CSM 120 to one of the OOCDs 150 as follows: from the CSM 120 through connection 112 to the platform 110; and from the platform 110 through connection 114 to one of the OOCDs 150. In another example, the control command can be sent from one of the BYODs 140 to one of the RSIs 130 as follows: from one of the BYODs 140 through connection 116 to the platform 110; and from the platform 110 through connection 118 to one of the RSIs 130. In another example, the control command can be sent from one of the BYODs 140 to another of the BYODs 140 as follows: from one of the BYODs 140 through connection 116 to the platform 110; and from the platform 110 through connection 116 to another of the BYODs 140. In another example, the control command can be sent from one of the BYODs 140 to one of the OOCDs 150 as follows: from one of the BYODs 140 through connection 116 to the platform 110; and from the platform 110 through connection 114 to one of the OOCDs 150. In another example, the control command can be sent from one of the OOCDs 150 to one of the RSIs 130 as follows: from one of the OOCDs 150 through connection 114 to the platform 110; and from the platform 110 through connection 118 to one of the RSIs 130. In another example, the control command can be sent from one of the OOCDs 150 to one of the BYODs 140 as follows: from one of the OOCDs 150 through connection 114 to the platform 110; and from the platform 110 through connection 116 to one of the BYODs 140. Other examples are also possible.

In the illustrated implementation of FIG. 1, the controller (i.e., the controlling device) issues commands (e.g., Start, Stop, Seek, etc.) with a content ID to the platform 110. The playback device receives the command and makes appropriate content and digital rights management (DRM) calls to execute the command. In one implementation, the content calls include calls directed to the CDNs 160 to deliver the content to the playback device (i.e., the controlled device). In one implementation, the auto entertainment service controls are initiated using pre-defined mechanisms within the applications or websites. That is, the sending device specifies the content ID and the DRM key using the pre-defined mechanisms to playback directly instead of allowing the receiving device construct the call. In another implementation, the auto entertainment service controls are initiated using voice commands (e.g., "Play Spider-Man Far from Home on the Johnny's phone").

In another implementation, the offline controls are enabled when the devices have been authenticated with the service but lose connectivity. Thus, in the offline mode, a temporary socket can be opened to facilitate direct communication 122 between the CSM 120 and the RSIs 130. For example, a local broker can serve as the platform allowing connections over a local net-work. That is, the functionality of the auto entertainment service controls resides within the CSM 120 so that it can be implemented locally within the car environment. Thus, the local broker would work on any local environment, but the local functionality is limited to the network in which it is installed and is no longer cross networks. For vehicle implementations, a connection is established between the CSM 120 and the RSIs 130 to ensure that the control is not lost with the loss of network.

In one implementation, the privilege auto platform 110 uses Message Queuing Telemetry Transport (MQTT) communication when communicating between devices 120, 130, 140, 150 regardless of the path of the communication. That is, the MQTT communication is used whether the communication goes through the privilege auto platform 110 (in an online mode) or a local MQTT broker (in an of fine mode). In one implementation, the MQTT messages used for privilege auto platform 110 are described below.

In one implementation, for connecting and subscribing, each device must first connect to the MQTT server, as part of the privilege auto platform 110. This requires the use of a uniform resource locator (URL) and a client ID. The URL is the same for all devices, so they are connected to the same server. The client ID must be unique. Otherwise, the server will disconnect any device already connected that has the same client ID.

In one implementation, the client ID should also be unique to each user account. This is the format that should be used when creating a unique client ID for a new device: <account_id>_<random_uuid>. This allows identification of the devices for a certain account while also using a randomly generated universally unique identifier (UUID) to prevent repeated IDs. The account_id can be any unique identifier provided by the APIs that is unique to the account. The random_uuid should be saved to the device and reused until the application is uninstalled.

In one implementation, for subscribing to topics, after establishing a connection, each device should subscribe to relevant topics. When a device subscribes to a specific topic, it will receive any messages sent over MQTT that have the specific topic name. For privilege auto platform 110, each device should connect to a topic that matches the account ID and a topic that matches the client ID. The account ID topic will receive any generic requests that are sent to all devices on the same account such as 'Resume All' or 'Pause All'. The client ID topic will receive the commands sent specifically to the unique device.

In one implementation, the message types include a connection status message, a ping message, a playback message, an application message, a media control message, and a playback status message.

In one implementation, the connection status message is a first message sent to the server once the device is connected and subscribed. Thus, this message alerts all other connected devices that this device is now connected as well. The connection status message should be sent upon connecting, upon disconnecting, and whenever a device sends out a ping message. Thus, the connection message should specify whether the device is "connected" or "disconnected" and should be sent to the account ID topic.

In one implementation, the ping message is used to determine which devices are still connected. A device is not: always able to send a "disconnected" message, so this allows each device to stay up-to-date on which devices are currently connected. This message can be used by any device, but it was designed to be used by the application of the center stack module (CSM). This allows the CSM to keep track of which devices are currently connected. If a device sends a ping message, it should receive a "connected" status message back from every device that is still connected. Any device that fails to respond in such a way should be considered "disconnected". These messages should be sent to the account ID topic so that all connected devices can receive the message and respond, but it can also be sent to specific client ID to get a specific device's status.

In one implementation, the playback message specifies a device to playback a particular piece of content. If a device receives a playback message it should immediately use the specified information to start playback, even if the playback was already occurring. The playback message should be sent to specific client ID topics that have been selected for playback. When sending a playback message, it is required that the playback type be provided. It is also required to send either a playback URL or a product ID. The playback URL will be deprecated in the future as all applications should use the product ID to request the proper playback URL. There are five types of playback: "movie", "show", "trailer", "playlist" and "youtube". Any receiving device will ignore a playback message that fails to provide the playback type and URL (or product ID when all applications run on the same promotion).

In one implementation, the application message specifies an application instance to control. This message can alter the application state including Open, Close, or Navigate-to-a-Page.

In one implementation, the media control message controls the playback on other devices. The possible media control options include pause, resume, sync, fast forward, rewind, seek, next, previous, and volume. If a receiving device is not currently performing playback, it should ignore these messages.

In one implementation, the playback status message notifies the other connected devices of the current playback status of the sending device. The playback status message notifies any changes to the playback (playing, paused, stopped, fast forwarding, or rewinding) and specifies the current playback progress. The playback status message should be sent to the account ID topic.

In one implementation, the MQTT broker and clients use Transport Layer Security (TLS) to encrypt the data passed between them. This security is part of the Transmission Control Protocol/Internet Protocol (TCP/IP) and not MQTT. This will protect all parts of the MQTT message and not just the message payload. In one implementation, the 'openssl' command is used to create the Certificate Authority (CA), server keys, and certificates. The broker server hosts the CA certificate, server certificate, and server key. Also, the broker configuration file sets the TLS version and the paths of the certificate and key files. The client applications need to have their own copy of the CA certificate and have their MQTT implementations updated to use it.

Figure 2:
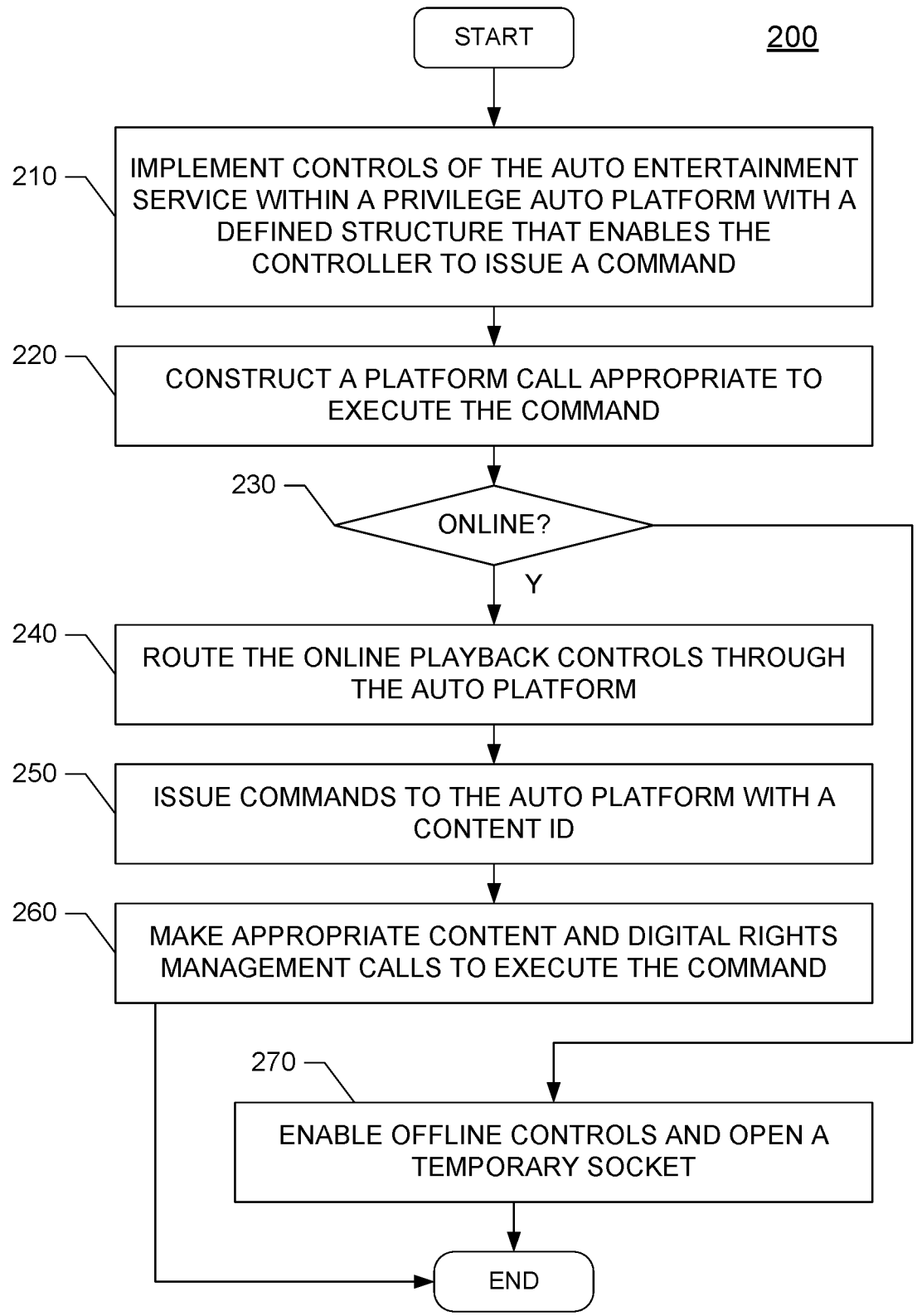
FIG. 2 is a flow diagram of a method for enabling control of authenticated applications and websites from other applications and websites within an auto entertainment service in accordance with one implementation of the present disclosure.

FIG. 2 is a flow diagram of a method 200 for enabling control of authenticated applications and websites from other applications and websites within an auto entertainment service in accordance with one implementation of the present disclosure. In the illustrated implementation of FIG. 2, the method 200 enables control of authenticated applications and websites on any one of the devices 120, 130, 140, 150 from other applications and websites on another one of the devices 120, 130, 140, 150 within an auto entertainment service.

In one implementation, controls of the auto entertainment service are implemented within a privilege auto platform, at step 210, with a defined structure that enables the controller to issue a command. Calls appropriate to execute the command are then constructed, at step 220, by the controller. The controls can be achieved online or offline.

In one implementation, if it is determined, at step 230, that the auto entertainment service is in an online mode, the online playback controls are routed through the privilege auto platform, at step 240, that routes data traffic, synchronizes video playback, and reports playback status. The controller issues commands (e.g., Start, Stop, Seek, etc.) with a content ID to the platform, at step 250. The playback device then receives the command and makes appropriate content and digital rights management (DRM) calls, at step 260, to execute the command. In one implementation, the content calls include calls directed to the CDNs 160 to deliver the content to the playback device. Otherwise, if it is determined, at step 230, that the auto entertainment service is in an offline mode (i.e., the devices have been authenticated with the service but lost connectivity), the offline controls are enabled and a temporary socket is opened, at step 270, to facilitate direct communication 122 between the CSM 120 and the RSIs 130.

Figure 3A:
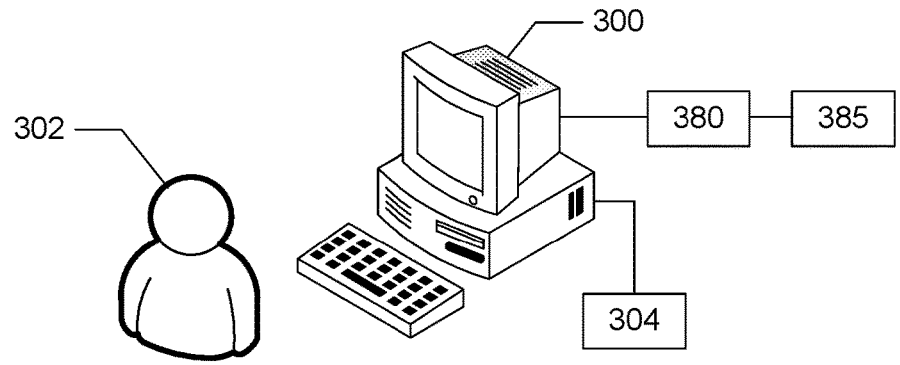
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement an auto privilege application 390 as illustrated and described with respect to the system 100 of the block diagram shown in FIG. 1 and the method 200 illustrated in FIG. 2.

Figure 3B:
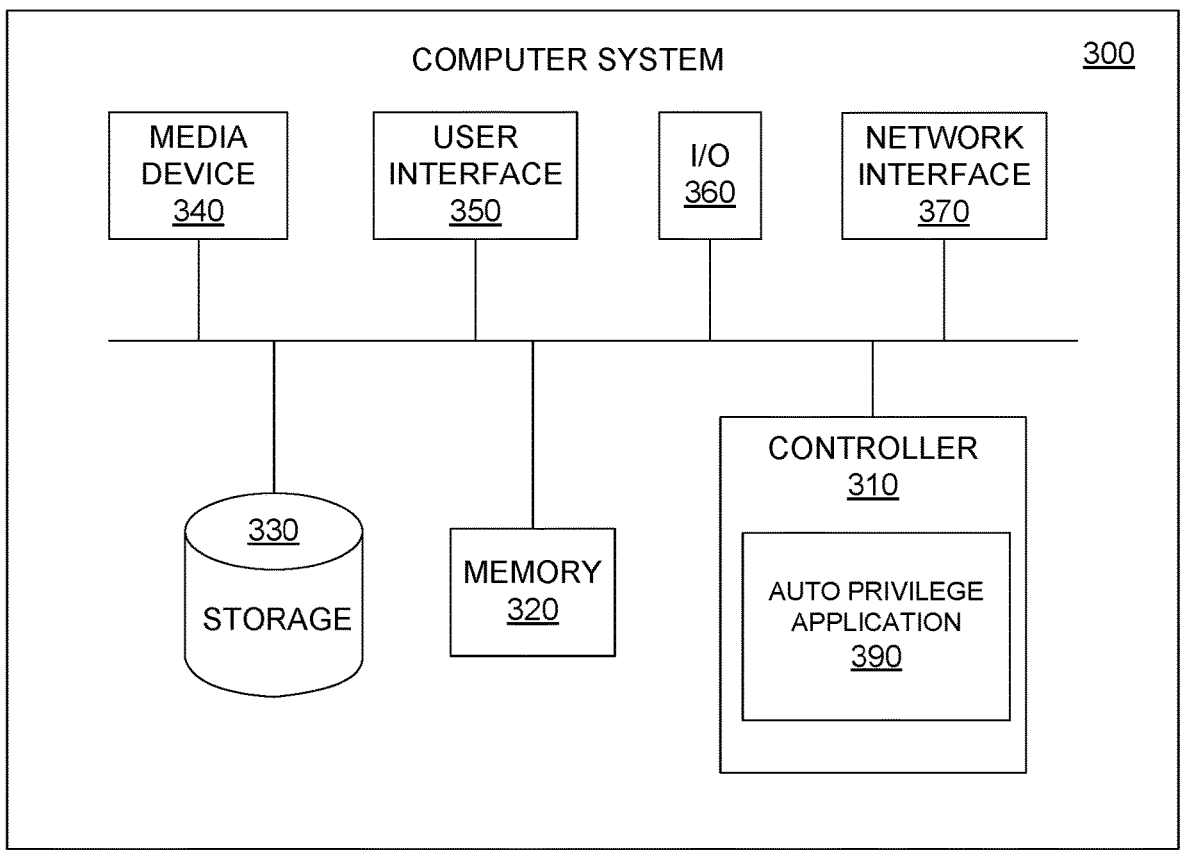
FIG. 3B is a functional block diagram illustrating the computer system hosting the auto privilege application in accordance with an implementation of the present disclosure.

The computer system 300 stores and executes the auto privilege application 390 of FIG. 3B. In addition, the computer system 300 may be in communication with a software program 304. Software program 304 may include the software code for the auto privilege application 390. Software program 304 may be loaded on an external medium such as a CD, DVD, or a storage drive, as will be explained further below.

Furthermore, computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the auto privilege application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the auto privilege application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the auto privilege application 390 with a software system, such as to enable the creation and configuration of engines and data extractors within the auto privilege application 390. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the auto privilege application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

In one implementation, the system 100 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 100 is configured with a combination of hardware and software.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system for enabling control of authenticated applications and websites from other applications and websites within an auto entertainment service, the system comprising:
    a center stack module including a front panel of an automobile;
    a privilege auto platform communicatively coupled to the center stack module, and configured to enable control of the authenticated applications and websites,
    wherein controls of the auto entertainment service are implemented within the privilege auto platform with a defined structure that enables the privilege auto platform to issue a command within an environment of the automobile,
    wherein the controls of the auto entertainment service are implemented in an online mode or offline mode;
    a plurality of devices communicatively coupled to the privilege auto platform, the plurality of devices comprising at least one controlled device and at least one controller,
    wherein the privilege auto platform is configured to enable control of the authenticated applications and websites on one of the at least one controlled device from other applications and websites on another of the at least one controller within the auto entertainment service,
    wherein the at least one controlled device constructs calls to execute the command, and
    wherein the controls in the online mode routes data traffic, synchronizes video playback, and reports playback status by sending control commands from the center stack module to at least one of the plurality of devices through the privilege auto platform; and
    a communication broker built to allow offline communications between the plurality of devices on a local network within the system.

2. The system of claim 1, wherein the plurality of devices comprises bring-your-own devices or out-of-car devices.

3. The system of claim 1, wherein the at least one controller issues the command with a content ID to the privilege auto platform.

4. The system of claim 3, wherein the at least one controlled device receives the command and makes calls for content and digital rights management to execute the command.

5. The system of claim 4, wherein the content calls comprise calls directed to content delivery networks to deliver the content to the at least one controlled device.

6. The system of claim 1, wherein the controls of the auto entertainment service are initiated using pre-defined mechanisms within the applications and websites.

7. A method for enabling control of authenticated applications and websites from other applications and websites within an auto entertainment service, the method comprising:
implementing controls of the auto entertainment service within a privilege auto platform with a defined structure that enables a controller to issue a command within an environment of an automobile,
wherein the privilege auto platform is configured to enable control of the authenticated applications and websites on a plurality of devices,
wherein the privilege auto platform is communicatively coupled to a center stack module, which includes a front panel of the automobile,
wherein the controls of the auto entertainment service are implemented in an online mode or offline mode;
routing data traffic, synchronizing video playback, and reporting playback status in the online mode by sending control commands from the center stack module to at least one of the plurality of devices through the privilege auto platform;
constructing calls for content to execute the command;
routing playback controls through the privilege auto platform;
issuing the command to the privilege auto platform with a content ID; and
receiving the command and making the calls for content and digital rights management to execute the command,
wherein making the calls for content includes enabling offline communications on a local network.

8. The method of claim 7, wherein the calls for the content include calls directed to content delivery networks to deliver the content to a controlled device in the online mode.

9. The method of claim 7, further comprising
enabling offline controls when the plurality of devices has been authenticated but lose connectivity by opening a temporary socket to facilitate direct communication between the controller and a controlled device in the offline mode.

10. The method of claim 7, wherein the controls of the auto entertainment service are initiated using pre-defined mechanisms within the authenticated applications and websites.

11. A non-transitory computer-readable storage medium storing a computer program to control authenticated applications and websites from other applications and websites within an auto entertainment service, the computer program comprising executable instructions that cause a computer to:
implement controls of the auto entertainment service within a privilege auto platform with a defined structure that enables a controller to issue a command within an environment of an automobile,
wherein the privilege auto platform is configured to enable control of the authenticated applications and websites on a plurality of devices,
wherein the privilege auto platform is communicatively coupled to a center stack module, which includes a front panel of the automobile,
wherein the controls of the auto entertainment service are implemented in an online mode or offline mode;
route data traffic, synchronize video playback, and report playback status in the online mode by sending control commands from the center stack module to at least one of the plurality of devices through the privilege auto platform;
construct calls for content to execute the command;
route playback controls through the privilege auto platform;
issue the command to the privilege auto platform with a content ID;
receive the command and making the calls for content and digital rights management to execute the command,
wherein making the calls for content includes enabling offline communications on a local network.

12. The non-transitory computer-readable storage medium of claim 11, wherein the calls for the content include calls directed to content delivery networks to deliver the content to a controlled device in the online mode.

13. The non-transitory computer-readable storage medium of claim 11, further comprise executable instructions that cause a computer to
enable offline controls when the plurality of devices has been authenticated but lose connectivity by open a temporary socket to facilitate direct communication between the controller and a controlled device in the offline mode.

* * * * *